United States Patent [19]

Clowers

[11] Patent Number: 4,628,605
[45] Date of Patent: Dec. 16, 1986

[54] ORBITAL BAYONET SAW

[75] Inventor: Earl R. Clowers, Jackson, Tenn.

[73] Assignee: Porter-Cable Corporation, Jackson, Tenn.

[21] Appl. No.: 742,986

[22] Filed: Jun. 10, 1985

[51] Int. Cl.[4] .................. B27B 11/02; B27B 19/09
[52] U.S. Cl. ................................. 30/393; 74/50
[58] Field of Search .................. 30/393, 392, 394; 74/50

[56] References Cited

U.S. PATENT DOCUMENTS

| | | |
|---|---|---|
| 3,303,861 | 2/1967 | Kane . |
| 3,339,598 | 11/1967 | Frostad . |
| 3,388,728 | 6/1968 | Riley, Jr. . |
| 3,454,061 | 7/1969 | Cordone et al. . |
| 3,457,796 | 7/1969 | Leach et al. ............... 74/50 |
| 3,461,732 | 8/1969 | Gregory . |
| 3,643,536 | 2/1972 | Alexander . |
| 3,665,983 | 5/1972 | Wagner et al. . |
| 3,695,344 | 10/1972 | Schnizler, Jr. . |
| 3,703,036 | 11/1972 | Karubian ............... 30/166 X |
| 3,738,003 | 6/1973 | Dietzen et al. ............... 30/392 |
| 3,754,330 | 8/1973 | Anderson et al. ............... 30/392 |
| 3,863,342 | 2/1975 | Griffies et al. ............... 30/393 |
| 3,942,251 | 3/1976 | Griffies et al. ............... 30/376 |
| 3,971,132 | 7/1976 | Griffies et al. ............... 30/393 |
| 4,083,112 | 4/1978 | Palm ............... 30/392 |
| 4,090,297 | 5/1978 | Wanner et al. ............... 30/374 |
| 4,137,632 | 2/1979 | Pfanzer ............... 30/393 |
| 4,195,403 | 4/1980 | Gruber ............... 30/123.3 |
| 4,200,417 | 4/1980 | Hager et al. ............... 408/67 |
| 4,207,953 | 6/1980 | Reibetanz et al. ............... 173/21 |
| 4,238,884 | 12/1980 | Walton, II ............... 30/393 |
| 4,240,204 | 12/1980 | Walton, II et al. ............... 30/393 |
| 4,250,971 | 2/1981 | Reibetanz et al. ............... 173/21 |
| 4,262,421 | 4/1981 | Bergler et al. ............... 30/393 |
| 4,272,996 | 6/1981 | Sauerwedn ............... 30/394 |
| 4,276,941 | 7/1981 | Wanner et al. ............... 173/117 |
| 4,361,957 | 12/1982 | Krotz ............... 30/124 |
| 4,385,443 | 5/1983 | O'Banion ............... 30/393 |
| 4,414,783 | 11/1983 | Vincent ............... 51/267 |
| 4,512,078 | 4/1985 | Pfanzer ............... 30/393 |
| 4,550,501 | 11/1985 | Moores ............... 30/393 |

Primary Examiner—Jimmy C. Peters
Attorney, Agent, or Firm—Merchant, Gould, Smith, Edell, Welter & Schmidt

[57] ABSTRACT

A bayonet-type saw having adjustable motor speed and orbital blade motion controls. A baffled passageway for directing air at the cutting zone is provided. An improved blade guide structure having a neck portion and two parallel spaced apart arms with a main roller bearing therebetween and saw blade side supporting nip rollers is included.

16 Claims, 13 Drawing Figures

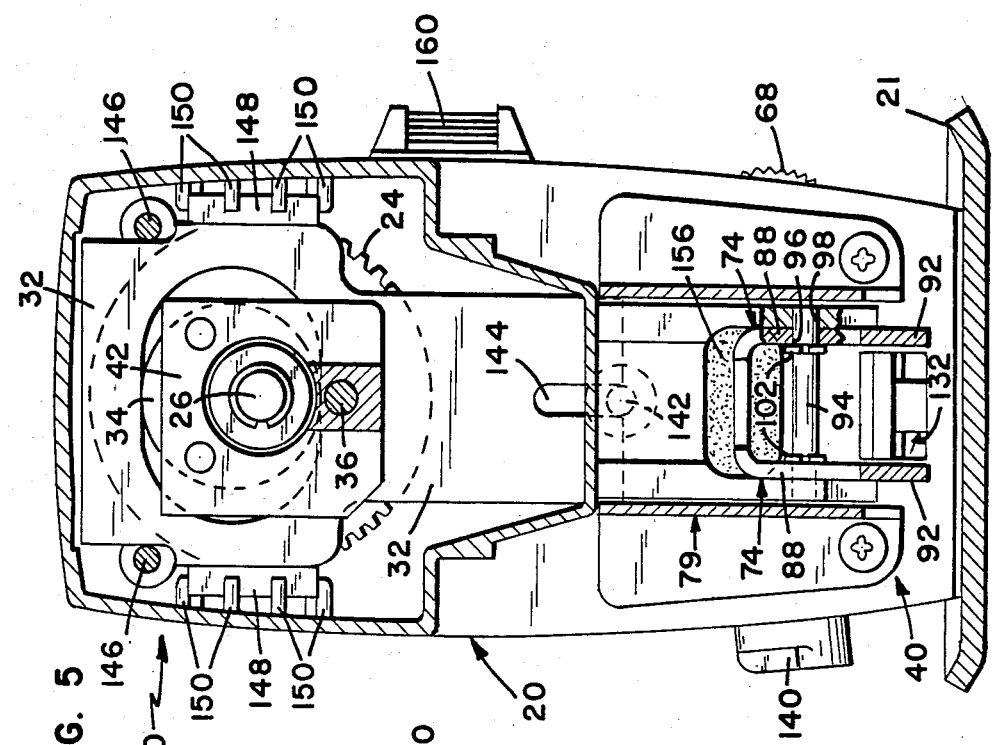
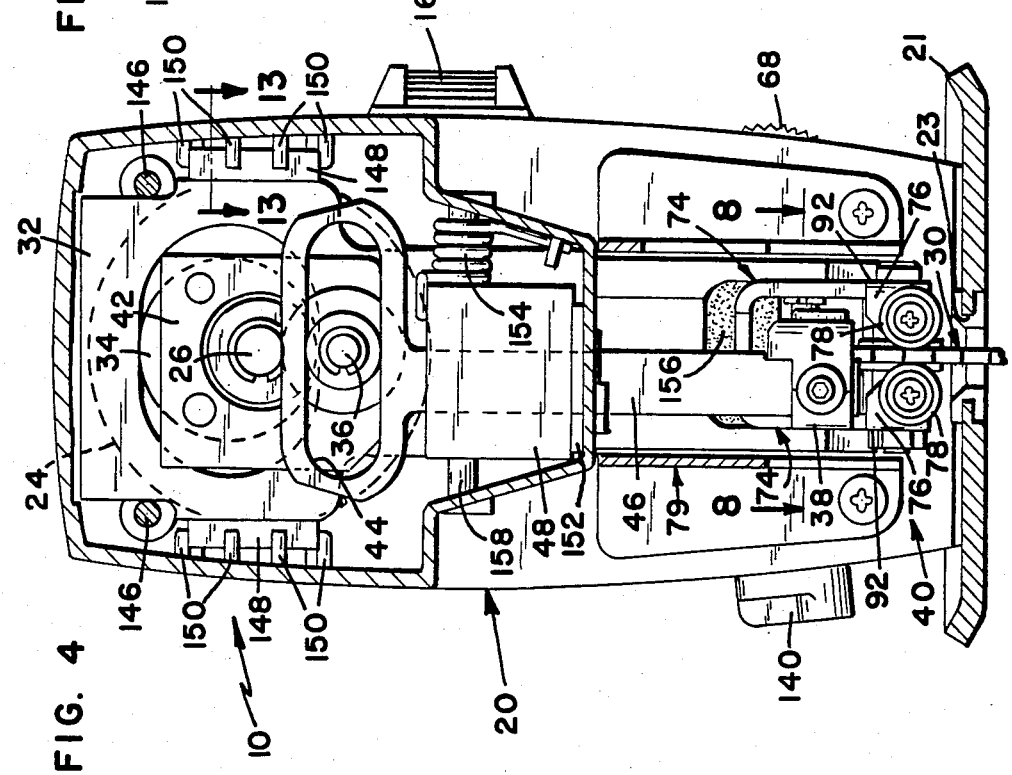

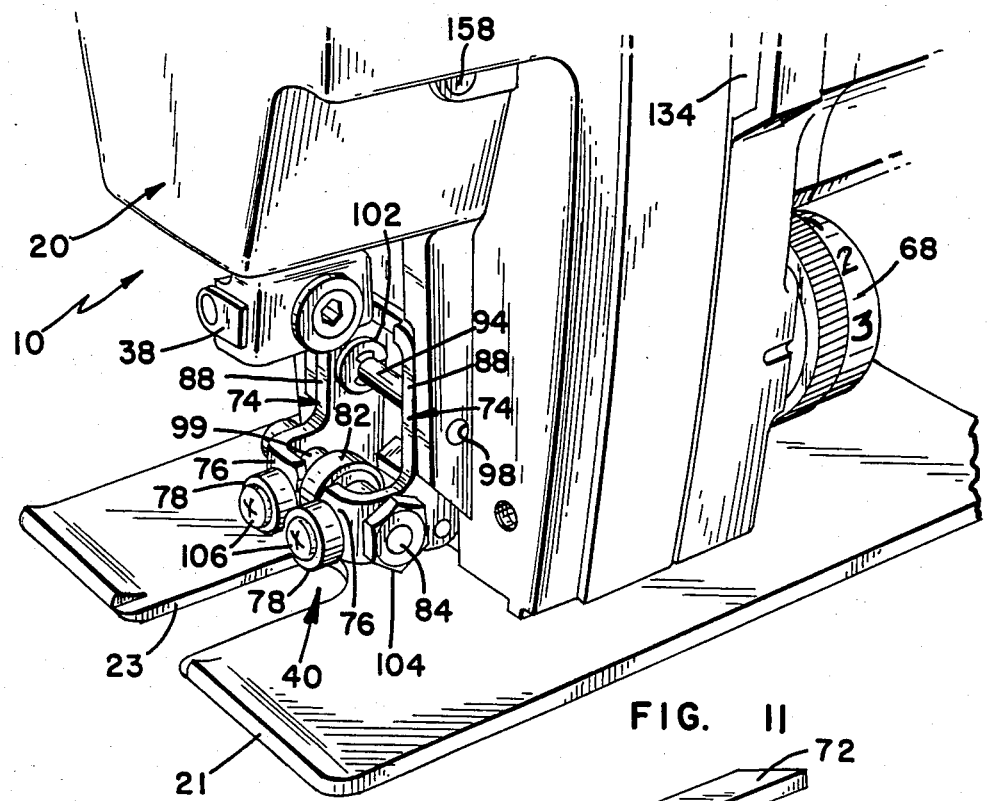
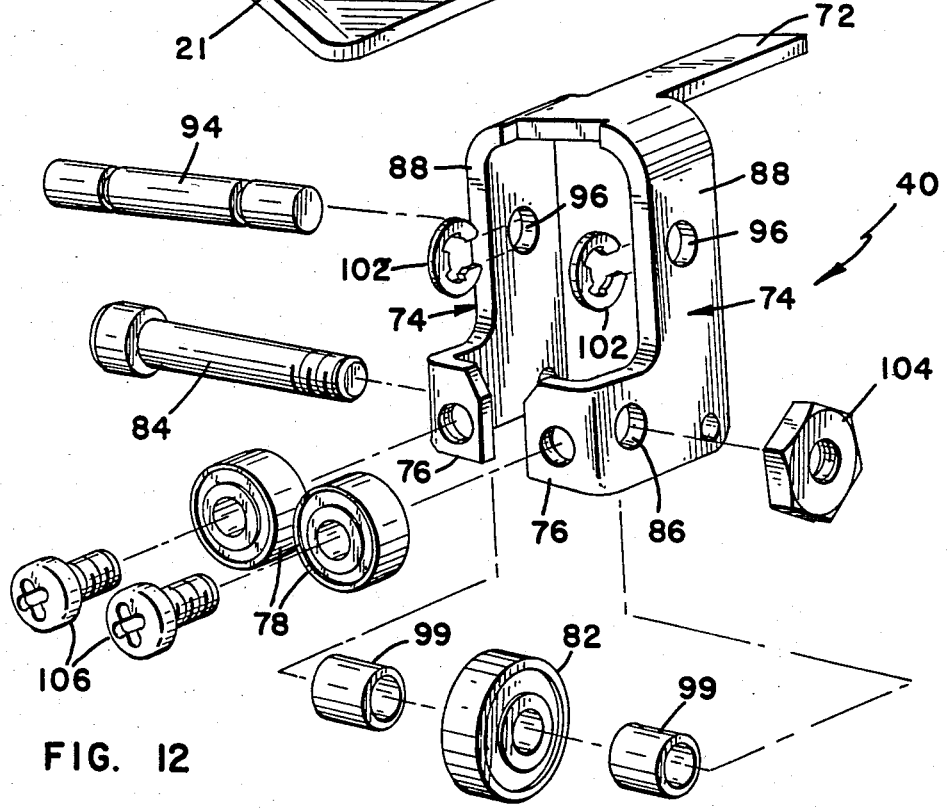
FIG. 11
FIG. 12

ORBITAL BAYONET SAW

TECHNICAL FIELD

The present invention relates to power saws such as reciprocating saws, sometimes known as jig saws or saber saws. The present invention relates more particularly to hand-held power saws having an orbital blade motion.

BACKGROUND

Many types of power-operated hand tools such as saber saws or jig saws are available. Many of these bayonet-type saws are capable of producing an orbital blade motion. Such a motion has a rectilinear component of a generally up and down nature, and a fore and aft motion advancing the cutting blade into the workpiece. Typically the blade advances on the cutting stroke, which conventionally is the upstroke on most saws.

One of the principal advantages of the bayonet type saw over circular saws and hand-operated band-type saws is the ability of the bayonet saw to make a curved cut along a relatively short radius.

Some bayonet-type saws have orbital motions which can be varied by the operator. Typically, when performing tight scrolling cuts, a rectilinear blade motion has been required. Performing small radius cuts exerts a twisting action on the cutting blade which can make control of the cutting path difficult. In many cases, this lack of control has resulted from the blade guide portion of the bayonet saw being incapable of adequately supporting and guiding the cutting blade.

Heretofore, bayonet-type saws have typically included a blade guide which has a roller wheel mounted for rotation along an axis generally parallel to the work surface and perpendicular to the up and down rectilinear blade motion. Such a blade guide supports only the back side of the cutting blade. During scroll cutting, the lack of lateral support of the cutting blade has proven disadvantageous.

A modified version of the above-described blade guide includes a notched or grooved roller bearing supporting the cutting blade. Such a bearing has a blade receiving groove or slot within the blade engaging surface. The blade rests in the slot and therefore is supported along its back side, and along the rear most portion of the sides of the blade, for the depth of the groove or slot. A grooved blade guide roller will typically prevent the back portion of the blade from moving laterally across the roller surface, but is of limited assistance in stabilizing the blade against twisting action encountered during scroll cutting. Attempting to make tight radial cuts with even this type of device can lead to a lack of control. The addition of an orbital motion to the blade, which normally speeds cutting of soft material such as wood, further aggravates the problem.

Consequently, currently available bayonet-type saws have required that scroll cutting be performed at an operating speed below the operator's ability because of the physical limitations of the tool.

The present invention provides an improved bayonet-type saw having a variable orbital blade motion. The saw includes a blade guide having a main rotating bearing, for engaging the back side of a cutting blade, and a pair of nip roller bearings for engaging the sides of the cutting blade. The saw also provides electronic speed control of the blade motion, and further includes a structure for selectively blowing air toward the cutting region for removing debris and saw dust to improve operator visibility of the cutting blade. Improved operator control and productivity are achieved. Scroll cutting, even with moderate orbital motion, and increased speed are possible.

SUMMARY OF THE INVENTION

The invention is an orbital bayonet-type saw having a motor enclosed within a housing. A drive mechanism for driving the saw blade in an up and down motion is enclosed within the housing. The drive means includes an output shaft on a motor, and an assembly gear turned by the output shaft. The assembly gear is itself rotatably mounted on a stationary assembly gear shaft which also supports a gear crank hub (which carries an oscillating counterweight), an orbit cam, and a crank with an offset shaft, all of which rotate with the assembly gear. The offset shaft or crank pin is affixed to the crank on the end of the assembly gear shaft opposite the assembly gear, with the orbit cam and gear crank hub therebetween. An elongated saw blade holder engages the offset shaft and is slideably mounted for vertical movement within a blade holder bearing within the housing. The other end of the blade holder arm includes a sawblade chuck.

The present invention further includes an orbit causing mechanism including an elongated orbit cam lever pivotally affixed at one end within the housing, with a cam following face at the opposite end. A cam lever lobe is located between the ends of the cam lever, and the orbit cam following face is positioned against the orbit cam on the assembly gear shaft. A spring holds the cam following face against the orbit cam during operation.

A saw blade guide is pivotally affixed to the housing. The saw blade guide has an extended neck passing through the housing and into position to oscillatingly contact the orbit cam lever lobe. The orbit cam lever lobe moves in an arc as the lever arm pivots and the cam following face engages the rotating orbit cam. The oscillating arc motion of the cam lever lobe produces an oscillating motion in the neck of the saw blade guide.

The saw blade guide further includes a pair of parallel arms, each affixed to the neck opposite the end of the neck which engages the cam lever lobe. The arms are parallel to each other in spaced relation. Each arm ends in a flange which lies perpendicular to the work surface and perpendicular to the straight ahead line of cut. The flanges each include a sawblade side supporting nip roller, and a main rotating bearing is located between the arms.

The invention includes a mechanism for varying the position of the pivot point of the orbit cam lever to control the amount of oscillation of the blade guide neck thus moving the saw blade guide and selectively controlling the orbital path of the associated saw blade.

BRIEF DESCRIPTION OF THE DRAWINGS

FIG. 4 is a front side sectional view taken generally along line 4—4 in FIG. 2.

FIG. 5 is a similar sectional view taken generally along line 5—5 in FIG. 2.

FIG. 11 is a partial perspective view on an enlarged scale, partially showing the blade guide.

FIG. 12 is an exploded perspective view showing the component parts of the blade guide subassembly on a further enlarged scale.

DETAILED DESCRIPTION OF THE INVENTION

Figure 1:
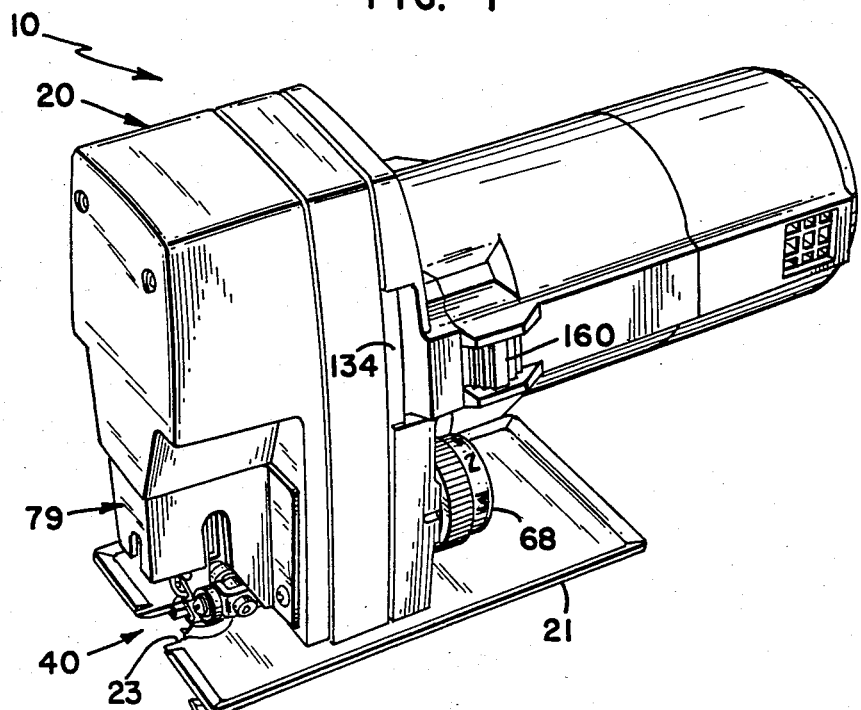
FIG. 1 is a perspective view of the preferred embodiment of the present invention.

Throughout the following description, reference will be made to the drawings. The same reference numerals will be used throughout the several views to indicate the same or like parts of the invention.

Referring now to FIG. 1, the bayonet saw 10 includes a housing 20, a supporting base 21, and a saw blade 30 lying generally outside of the housing 20. The saw blade 30 is supported and rides partially within a blade guide 40, and through a slot 23 in the base 21. The base 21 supports the housing 20 so saw 30 is at a desired orientation to a work piece being sawed.

Figure 2:
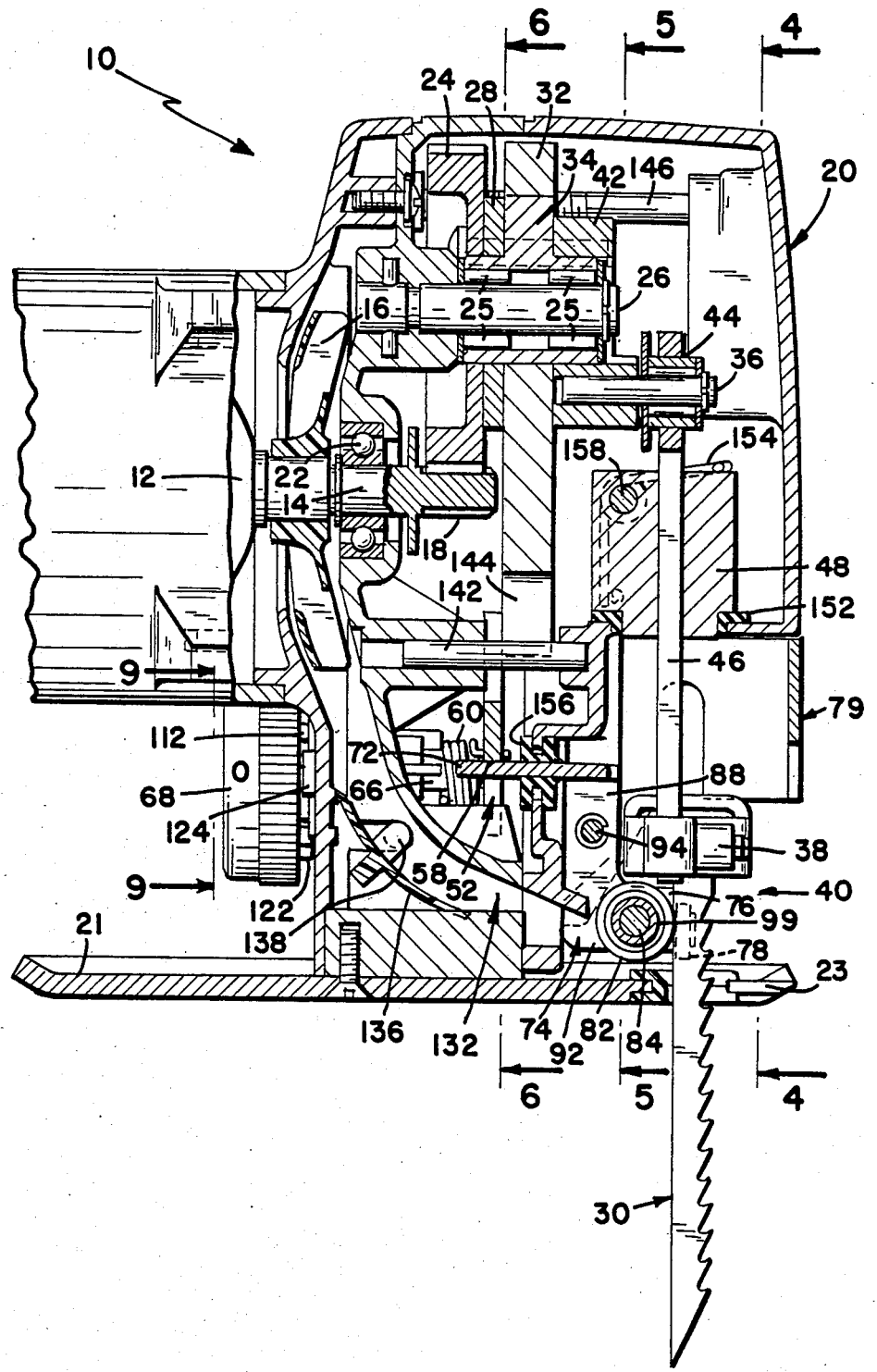
FIG. 2 is a partial side elevational view of the embodiment in FIG. 1, with portions shown in cross-section and the mechanism in a first position.

In reference now to FIG. 2, the driving mechanism for the saw includes a motor 12 with an output shaft 14. The output shaft has mounted thereon an impeller or rotor 16 which exhausts heat from the motor 12 and provides a source of air for removing shavings, debris, and saw dust from the cutting zone, as will be described later. The output shaft 14 has geared teeth 18 on its outward end and is supported by a bearing 22. The teeth 18 on the output shaft 14 engage an assembly gear 24 which rotates about its center on needle bearings 25 on a stationary assembly gear shaft 26. The assembly gear shaft also includes an orbit cam 28 adjacent to the assembly gear. A counterweight 32 is provided for generally up and down motion on a gear crank hub 34 on the assembly gear shaft 26 outboard of the orbit cam 28.

The gear crank hub 34 is rotatably affixed on the assembly gear shaft 26 with bearings 25 therebetween. A crank 42 is mounted on the gear crank hub 34 and includes a crank pin or offset shaft 36 which orbits the stationary assembly gear shaft 26. The offset shaft has an inboard end received within the crank 42 and an outboard end which is received within an oval slot 44 formed at one end of a blade holder arm 46.

The blade holder arm or carrier 46 is slideably received within a blade holder bearing 48 supported by the housing 20. The blade holder arm or carrier makes a generally rectilinear up and down motion during operation. The rotational motion of the motor is transmitted through a geared reduction to a rotational motion of the assembly gear 24 and the associated orbit cam, gear crank hub, and crank. The oval slot 44 within the blade holder arm 46 converts the vertical component of the circular offset shaft motion into up and down rectilinear motion. The horizontal component of the circular offset shaft motion is expended as the offset shaft moves horizontally in the oval opening of the blade holder arm 46. A blade grasping chuck 38 is affixed to the end of the blade holder 46 outside of the housing 20.

Figure 7:
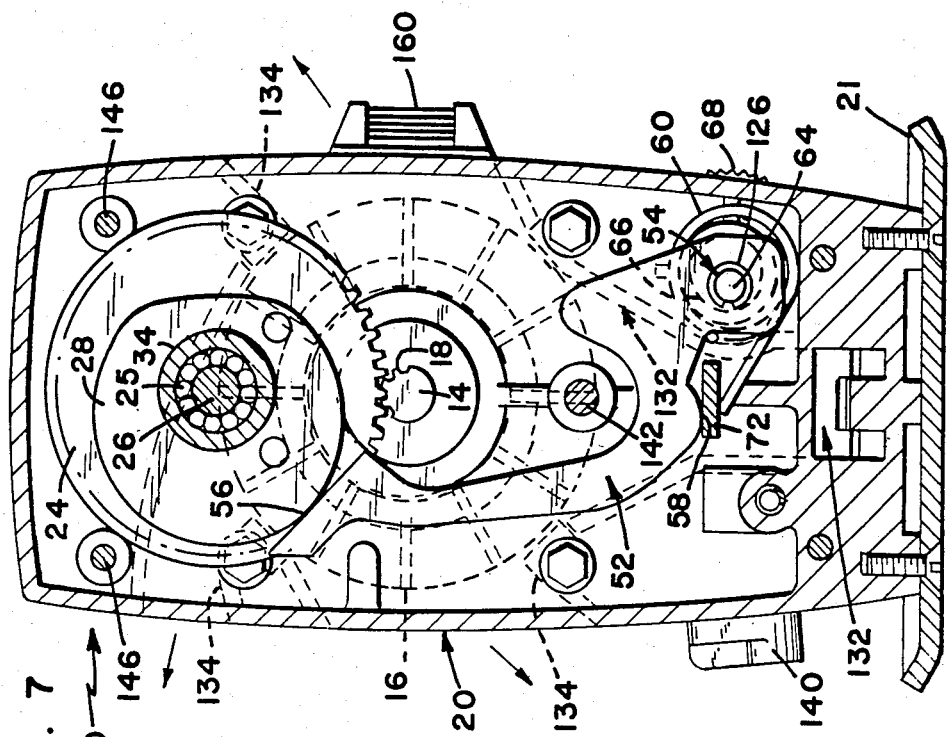
FIG. 7 is yet another similar sectional view taken generally along line 7—7 in FIG. 3.
Figure 6:
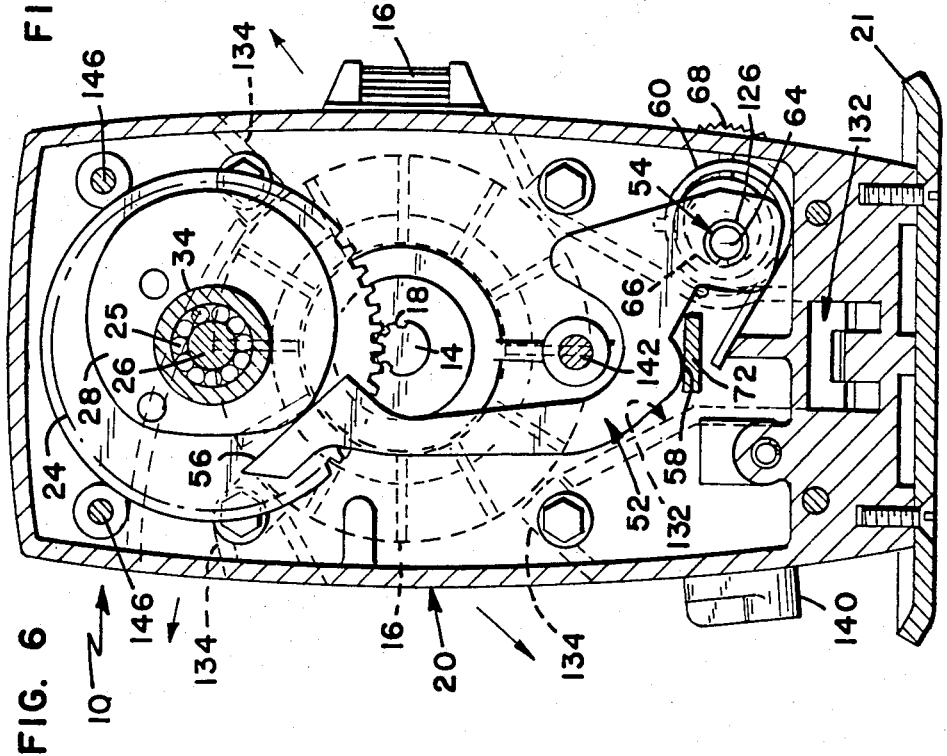
FIG. 6 is another similar sectional view taken generally along line 6—6 in FIG. 2.

The invention also includes an orbit causing mechanism. In reference now specifically to FIGS. 6 and 7, the orbit causing mechanism includes the orbit cam 28 and an orbit cam lever 52. The orbit cam lever 52 is pivotally affixed at one end at a point 54 within the housing. The orbit cam lever has a cam following face 56 at the opposite end, with a cam lever lobe 58 therebetween. A spring 60 hooks beneath the orbit cam lever and forces the cam following face 56 to press against the orbit cam 28.

The pivot point 54 of the cam lever is movable about an arc shaped path. The cam lever arm pivots on a pivot pin 64 offset from the center of an orbit control shaft 66 including an orbit control knob 68 (see FIG. 3). Rotation of the orbit control knob 68 and shaft 66 moves the pivot pin 64 about approximately 180 degrees of arc. This movement of the pivot pin changes the pivot point 54 of the orbit cam lever 52 from a first position, wherein no orbital motion is imparted to the saw blade 30, to a second position where a substantial orbital motion is imparted to the saw blade.

Orbital motion of the saw blade, or motion for and aft in the direction of the saw blade cutting path, is caused by the action of the saw blade guide 40. As perhaps best seen in FIGS. 11 and 12, the saw blade guide 40 has an extended neck member 72 which passes through the housing 20 and contacts the orbit cam lever lobe 58. The blade guide includes a pair of parallel arms 74, affixed to the neck 72 opposite the point of engagement of the neck with the orbit cam lever lobe 58. The arms 74 are parallel and spaced from each other. Each arm terminates in a flange 76. The two flanges are coplanar and each includes a saw blade side supporting nip roller 78. The nip rollers are affixed to the flanges 76 in rotating fashion by screws 106 or the like. The nip rollers do not contact each other as is conventional in a nip roller, but rather are spaced apart substantially the width of a saw blade.

A main rotating bearing 82 is positioned between the arms 74 of the saw blade guide 40 on an axle pin 84 received by colinear orifices 86 between the arms 74 of the saw blade guide 40. The main bearing 82 lies generally in the plane of the saw blade motion. Each arm includes a vertically extending upper arm portion 88 and a horizontally extending lower arm portion 92.

The blade guide 40 is affixed to the housing in pivoting relation by a pivot pin 94 extending through the parallel arms 74 and received by colinear orifices 96 in the arms and extending into the colinear orifices 98 within the body or housing 20. The main roller bearing 82 can be centrally positioned on the axle pin 84 between a pair of bushings 99. The pivot pin 94 may be retained in position by a pair of C-clips 102. The axle pin 84 may be threaded and engage a nut 104 for holding the main bearing 82 in position (see FIG. 12). Alternately, one of the parallel arms may be threaded to engage the axle pin 84.

Figure 8:
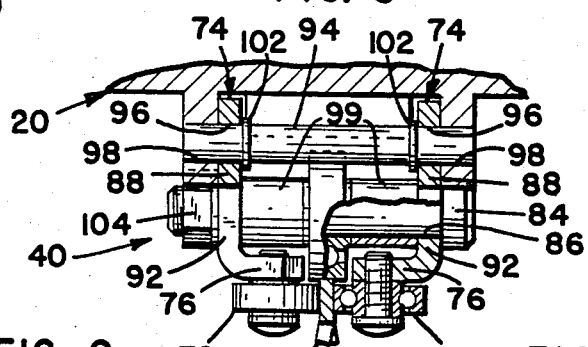
FIG. 8 is a fragmentary sectional view taken generally along line 8—8 in FIG. 4 on an enlarged scale with portions broken away.

The bearing 82 and the nip rollers 78 may comprise roller bearings (see FIG. 8) which includes a hardened outer race or running surface. The nip roller bearings 78 may be affixed to the flanges 76 of the blade guide by screws 106 (see FIG. 12), rivets or other suitable means. A chip deflecting shield 79 partially encompasses the saw blade guide 40 and chuck 38.

Figure 9:
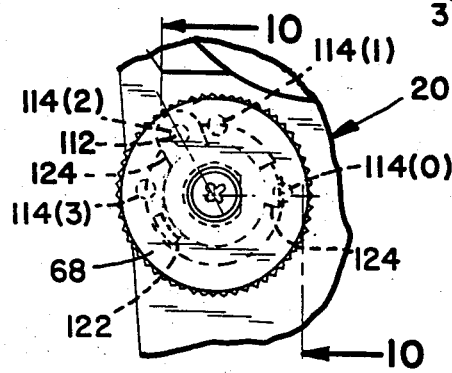
FIG. 9 is a partial fragmentary elevational view taken generally along line 9—9 in FIG. 2, on a similar scale.
Figure 10:
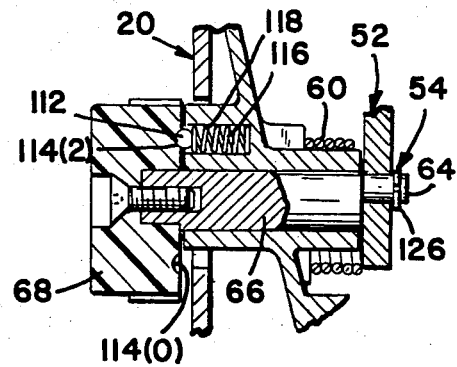
FIG. 10 is a partial elevational view, with portions shown in cross-section, taken generally along 10—10 in FIG. 9 on a similar scale.

In reference now to FIGS. 9 and 10, the orbit control mechanism, including the orbit control knob 68 is shown. The knob includes a roller bearing detent system. The detent system includes a ball 112 urged against a ball sized detent 114 on the inside surface of the knob 68 by a spring 116 within a hole 118 in the housing 20. The mechanism allows the orbit control knob and the orbit control pin 64 affixed thereto to be selectively positioned in one of a number of locations. The knob 68 has a number of detents 114 (see FIG. 9) each of which serves to hold the knob in a given position. Four detents are shown. They have been labeled for operator identification with markings (0) through (3). The detents are spaced over a range of approximately 180 degrees of arc, and the motion of the knob 66 is limited to this range by a block 122 and two stops 124.

At the end of the orbit control shaft 66 opposite the orbit control knob 68 lies an orbit lever pivot pin 64 offset from the axis of rotation of the orbit control shaft 66. The orbit lever pivot pin engages the orbit cam lever 52 and serves as the pivot point 54 thereof. The orbit cam lever may be retained on the orbit lever pivot pin by a C-ring 126 or the like. Rotation of the orbit control knob moves the pivot point of the orbit cam lever about an arc. The pivot point of the orbit control lever can be positioned in a first position (the zero position shown on the orbit control knob) wherein no oscillation of the blade guide neck is caused by the orbit cam lever. Rotation of the orbit control knob 180 degrees (to the "3" position shown on the orbit control knob) results in a second position wherein a substantial (maximum) oscillation of the blade guide neck is caused by the orbit cam lever. A plurality of intermediate positions between the first position (0) and the second position (3) are possible. These positions of the knob produce intermediate orbital blade motions. For operator convenience, two of these positions are indicated as (1) and (2) on the orbit control knob. More positions are possible, and the tool can be operated with the knob between detents.

Figure 3:
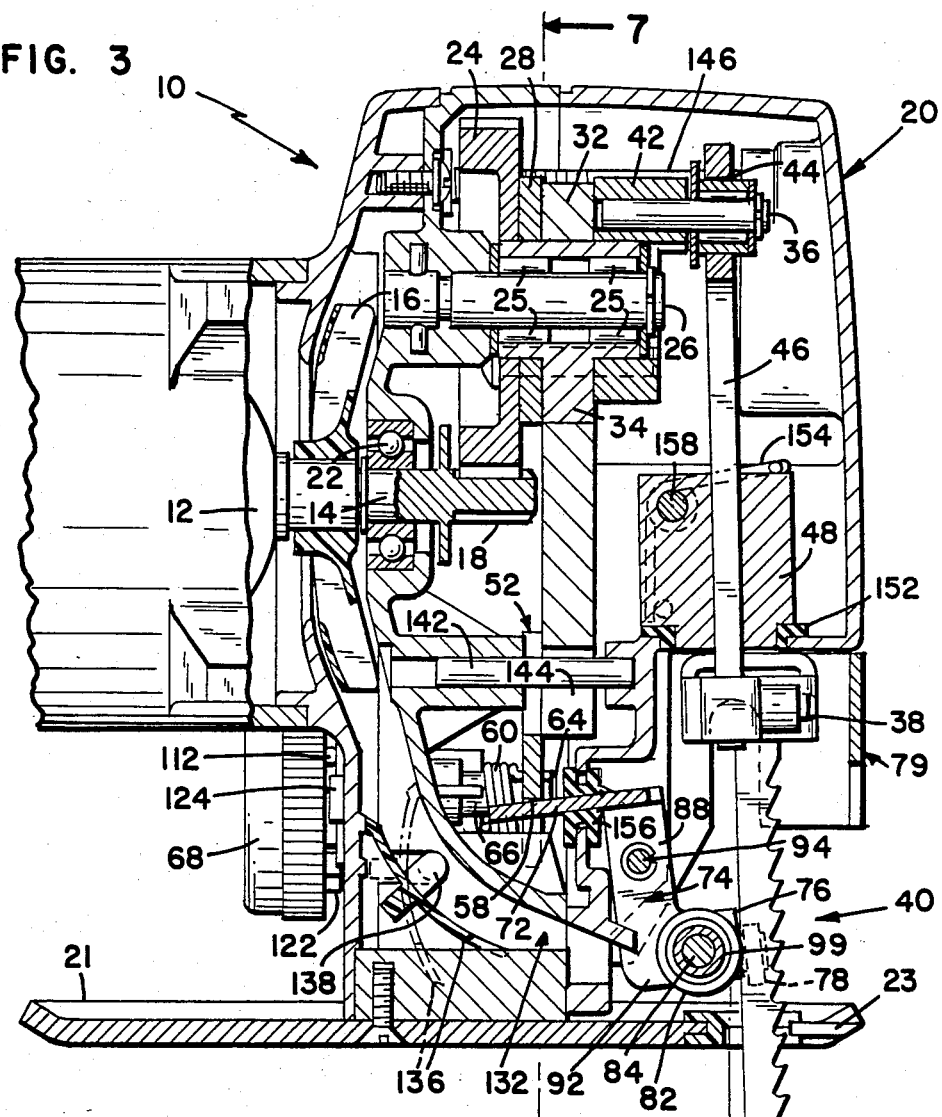
FIG. 3 is another partial elevational view similar to FIG. 1, but showing the mechanism in a second position.

In reference now to FIG. 3, the blower control feature is shown. This feature comprises an inner air shaft 132 operatively connected to the cooling air impeller 16 affixed to the output shaft 14 of the motor 12. Cooling air drawn over the motor by the impeller is expelled from the housing 20 through four exit passageways. Three of these passageways, collectively numbered 134, pass radially outwardly through the opposite sides of the housing. The fourth passageway or airshaft 132 passes downwardly generally toward the area where the saw blade 30 is generating saw dust while in use. This passageway 132 includes a moveable baffle plate 136 which can be positioned in an open position (see FIG. 3) wherein air flow passes unobstructed toward the area of cutting. This airflow is useful for blowing away sawdust, debris and cuttings. This greatly aids the visibility of the operator, particularly when attempting to cut along a line or other mark. The baffle can be moved to completely obstruct the passageway 132 (dotted line in FIG. 3), in which case all of the cooling air exits through the three side openings 134. This position is useful when using the invention in conjunction with cutting metals or other materials which might require the use of a lubricant for the cutting blade. An exhaust directed toward the cutting area might remove the cutting lubricant in a disadvantageous manner. The baffle plate 136 is mounted for rotation about a baffle shaft 138 including a baffle control knob 140 outside the housing 20.

Figure 13:
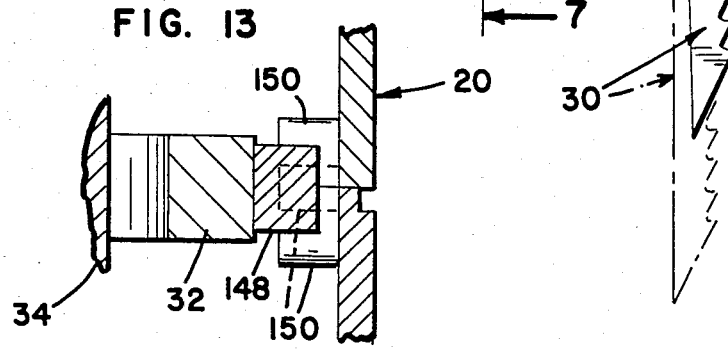
FIG. 13 is a partial sectional plan view taken along line 13—13 of FIG. 4 on an enlarged scale.

Further constructional details of the invention include a transverse counterweight lower guide pin 142 located within the housing for receiving a slot 144 within the bottom portion of the counterweight 32 and a pair of transverse upper guide pins 146. This mechanism retains the counterweight so that it performs an oscillating motion in a nearly rectilinear fashion. The counterweight is further controlled by a pair of slider guide bearing pins 148 held between lugs 150 located within the housing 20 adjacent the location of the counterweight (see FIGS. 4 and 13). The slider guide bearing pins 148 may be of circular cross-section, and the lugs 150 may be positioned other than as shown to retain the pins 148.

The blade holder bearing block 48 is mounted within the housing 20 and includes a blade holder bearing gasket 152 between the bearing block and the housing. The bearing is biased to maintain the blade holder in a generally perpendicular position by a bearing spring 154. A blade guide gasket 156 is positioned between the blade guide neck 72 and the housing 20. These gaskets help prevent the entry of debris and foreign matter into the housing. The bearing block can pivot against the force of the bearing spring 154, on a bearing block pin 158. This pivoting action accommodates the motion of the blade holder during orbital saw blade motion.

OPERATION

The operator will select and install an appropriate saw blade for use in cutting the desired work material. The operator can then select a desired blade speed by presetting an electronic control (not shown). An orbit path is then selected and the operator positions the orbit control knob 68 in the appropriate position. Turning on the motor by a conventional trigger or slide switch 160 then produces a rotational motion in the output shaft and associated assembly gear. This produces a rotation of the assembly gear, orbit cam, gear crank hub and crank. An oscillating motion of the counterweight and an orbiting motion of the crank pin follow. The crank pin produces a generally rectilinear up and down motion of the blade holder.

The blade holder moves in slideable fashion within the blade holder bearing block. The bearing block is spring-loaded to keep the blade holder in a generally vertical orientation. The blade holder block can pivot on the bearing block pin to accommodate orbital blade motion. An up and down motion is then transmitted to the saw blade through the blade holder arm and blade grasping chuck.

Orbital motion of the saw blade is produced by the action of the orbit cam on the cam following face of the orbit cam lever. The orbit cam lever pivots about its pivot point attached to the orbit control knob and shaft. When the orbit control knob is positioned to produce orbital motion of the blade, the orbit cam lever lobe deflects the neck portion of the blade guide. This deflection of the neck portion of the blade guide causes the blade guide to pivot about its pivot pin forcing the parallel arms of the blade guide and the associated main bearing to move in a fore and aft direction. This motion carries the saw blade with the main bearing and nip roller bearings. The forward thrust of the main roller bearing takes place generally during the up stroke of the blade holder. The forward thrust is caused by a downward action of the cam lever lobe against the neck portion of the blade guide. As the orbit cam rotates, the cam lever lobe moves in an upward direction returning the blade guide to its normal position. This return action generally takes place on the downward (noncutting) stroke of the blade holder and associated blade.

Adjustment in motor speed, blade orbit, and blower volume can be made by the operator at any time. Adjustments to these controls can even be made during use of the device. By making appropriate adjustments in the motor speed, orbit path and blower volume, the operator can achieve maximum productivity. The blade guide structure allows improved stability and control during scroll-type cuts and the speed control and orbit control mechanisms allow optimal blade path and speed to be selected. The baffled passageway allows improved visibility when the operator is following a mark or cutting line, yet allows the volume of air directed toward the cutting zone to be eliminated if desired.

A number of characteristics and advantages of the invention have been set forth above, together with the structure and operation of the preferred embodiment of the orbital bayonet saw. The novel features thereof are pointed out in the following claims. The above disclosure is merely illustrative, and changes may be made in detail with respect to the size, shape, choice of materials and structural arrangement of the device within the principles of the invention to the full extent intended by the broad general meaning of the following claims.

What is claimed is:

1. A blade guide for a bayonet type saw including a housing, a motor within said housing, a driving means connected to the motor for producing an up and down motion in a saw blade connected to the driving means and an orbit producing means for causing said blade to orbit in a plane including said up and down blade motion;
    said orbit producing means including a reciprocating lever member operatively connected to said motor and a blade guide which engages said lever and said blade, said blade guide comprising:
    a neck member positioned within said body to engage said lever;
    first and second parallel arms perpendicularly extending from said neck and each terminating in a flange, said flange on said first arm coplanar with said flange on said second arm and said plane of said flanges perpendicular to said neck and perpendicular to said arms;
    a main rotating bearing positioned between said arms in the plane of said saw blade motion and engaging the back surface of said saw blade; and,
    a pair of nip roller bearings affixed to said flanges and forming a nip substantially the width of a saw blade, said nip rollers engaging the opposite sides of said saw blade.

2. The blade guide of claim 1 further comprising a pivot pin extending through said parallel arms and received by colinear orifices within said housing.

3. The blade guide of claim 1 further comprising a pair of bushings and an axle pin for affixing said main bearing in a central position between said arms.

4. The blade guide of claim 3 wherein said parallel arms each include a vertically extending upper arm portion and a horizontally extending lower arm portion.

5. The blade guide of claim 4 wherein said axle pin spans said lower arm portions and is received by colinear orifices within said lower arm portions.

6. An orbital jig saw having a housing, a motor within said housing, a motor driven reciprocal saw blade carrier with a saw blade, and orbital drive means, said orbital drive means comprising:
    a pivoting cam following yoke member connected to a cam on said motor and a movable blade guide affixed to said housing in deflecting relation between said lever and said saw blade, said lever deflecting said blade guide on movement of said cam;
    said saw blade guide having an extended neck member passing through said housing and engaging said lever;
    a pair of parallel arms, each affixed to said neck opposite said abutment with said yoke, said arms parallel to each other in spaced relation and terminating in coplanar flanges, each of said flanges including a saw blade side supporting nip roller rotatably affixed thereto, said arms receiving a main rotating bearing therebetween, said main bearing positioned to lie in contact with the back side of said saw blade; and,
    means for variably positioning the pivot point of said pivoting lever to selectively control said deflection of said neck member, from a first position wherein no deflection of said neck is caused by said yoke, to a second position wherein a substantial deflection of said neck is caused by said yoke.

7. The device of claim 6 wherein said deflection of said neck member produces an orbital motion of said saw blade.

8. The device of claim 6 wherein means for variably positioning said pivot point includes a plurality of intermediate positions between said first position and said second position.

9. The device of claim 6 further comprising a pivot pin extending through said parallel arms and received by colinear orifices within said housing.

10. The device of claim 6 further comprising a pair of bushings and an axle pin for affixing said main bearing in a central position between said arms.

11. An orbital saw comprising:
    a motor;
    a housing surrounding said motor;
    a drive means for driving a saw blade external of said housing in an up and down motion, said drive means including an output shaft on said motor, an assembly gear, engaging said output shaft and rotatably mounted on an assembly gear shaft, a counter weight rotatably affixed on said assembly gear shaft, an orbit cam rotatably affixed on said assembly gear shaft between said assembly gear and said counter weight, and an offset shaft affixed to and orbiting said assembly gear shaft;
    an elongated saw blade holder arm mounted for substantially vertical movement within said housing and including an oval slot at one end, said slot receiving said offset shaft, and a saw blade chuck at the opposite end of said arm;
    an orbit causing means for causing an orbital blade motion including an elongated orbit cam lever pivotally affixed at one end at a point within said housing and having a cam following face at the opposite end and a cam lever lobe therebetween, said orbit cam following face positioned against said orbit cam, a biasing means for holding said cam following face against said orbit cam;

a saw blade guide having an extended neck member passing through said housing and oscillatingly contacting said orbit cam lever lobe;

a pair of parallel arms, each affixed to said neck opposite said engagement with said orbit cam lever, said arms parallel to each other in spaced relation and terminating in coplanar flanges, each of said flanges including a saw blade side supporting nip roller rotatably affixed thereto, said arms receiving a main rotating bearing therebetween, said main bearing contacting the back side of said saw blade; and, means for variably positioning the pivot point of said orbit cam lever to selectively control said oscillation of said neck member, from a first position wherein no oscillation of said neck is caused by said orbit cam lever, to a second position wherein a substantial oscillation of said neck is caused by said orbit cam lever.

12. The device of claim 11 wherein means for variably positioning said pivot point includes a plurality of intermediate positions between said first position and said second position.

13. The device of claim 11 further comprising a pivot pin extending through said parallel saw blade guide arms and received by colinear orifices within said housing.

14. The device of claim 11 further comprising a pair of bushings and an axle pin for affixing said main bearing in a central position between said saw blade guide arms.

15. The device of claim 12, further comprising an orbit control shaft mounted for rotation with said housing and including an orbit control knob affixed at one end thereto and an orbit lever pivot pin mounted on said orbit control shaft opposite said knob, said orbit lever pivot pin mounted from the axis of rotation of said shaft and engaging said pivot point of said orbit cam lever to move said pivot point of said orbit cam lever in an arc.

16. The device of claim 12 further comprising an orbit control shaft mounted for rotation with said housing and including an orbit control knob affixed at one end thereto and an orbit lever pivot pin mounted on said orbit control shaft opposite said knob, said orbit lever pivot pin mounted from the axis of rotation of said shaft and engaging said pivot point of said orbit cam lever to move said pivot point of said orbit cam lever in an arc.

* * * * *